(12) United States Patent
Wen et al.

(10) Patent No.: US 8,218,915 B2
(45) Date of Patent: Jul. 10, 2012

(54) ASYMMETRICAL INTERLEAVER AND DEINTERLEAVER

(75) Inventors: Zhenli Wen, Shanghai (CN); Fan Chen, Shanghai (CN); Fahua Lan, Shanghai (CN); Kevin Dapeng Zhang, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 477 days.

(21) Appl. No.: 12/561,077

(22) Filed: Sep. 16, 2009

(65) Prior Publication Data

US 2011/0064406 A1   Mar. 17, 2011

(51) Int. Cl.
*G02B 6/00* (2006.01)
*H04J 14/00* (2006.01)

(52) U.S. Cl. ............... 385/11; 385/15; 385/24; 385/31; 385/32; 385/33; 398/45

(58) Field of Classification Search .............. 385/15, 385/11, 31, 32, 33, 34, 42, 47, 24, 27, 28, 385/36; 359/497, 124, 127, 483, 494, 495, 359/498; 398/45
See application file for complete search history.

(56) References Cited

U.S. PATENT DOCUMENTS

| | | | |
|---|---|---|---|
| 6,574,049 B1 * | 6/2003 | Qian et al. | 359/634 |
| 6,694,066 B2 | 2/2004 | Xie et al. | |
| 6,850,364 B2 | 2/2005 | Xie et al. | |
| 7,042,571 B2 | 5/2006 | Wang et al. | |
| 7,173,763 B2 | 2/2007 | Du et al. | |
| 7,228,025 B1 | 6/2007 | Zhong et al. | |
| 7,268,944 B2 | 9/2007 | Du et al. | |
| 2002/0154845 A1 | 10/2002 | Xie et al. | |
| 2004/0246582 A1 * | 12/2004 | Du et al. | 359/497 |
| 2007/0070505 A1 | 3/2007 | Hsieh | |
| 2011/0064406 A1 * | 3/2011 | Wen et al. | 398/45 |
| 2011/0069959 A1 * | 3/2011 | Chen et al. | 398/79 |
| 2011/0194810 A1 * | 8/2011 | Chen et al. | 385/24 |

OTHER PUBLICATIONS

Optoplex Asymmetric Optical Interleaver, Optical signal interleaver, available on the internet at: http://www.optoplex.com/Asymmetric_interleaver.htm, date accessed: Sep. 23, 2009.

* cited by examiner

*Primary Examiner* — Brian Healy
(74) *Attorney, Agent, or Firm* — Maschoff Gilmore & Israelsen

(57) ABSTRACT

Asymmetrical interleavers and deinterleavers. In one example embodiment, an asymmetrical deinterleaver includes first, second, third, fourth, and fifth filter cells interleaved with first, second, third, and fourth waveplates and followed by a fifth waveplate. The filter cells are configured to filter optical signals propagating on first and second legs of an optical loop. The asymmetrical deinterleaver also includes a retro reflector optically coupled with the filter cells and waveplates. The retro reflector is configured to reflect the optical signals between the first leg and the second leg to form the optical loop. The asymmetrical deinterleaver further includes a single-fiber collimator optically coupled to the first leg of the optical loop and a dual-fiber collimator optically coupled to the second leg of the optical loop.

20 Claims, 7 Drawing Sheets

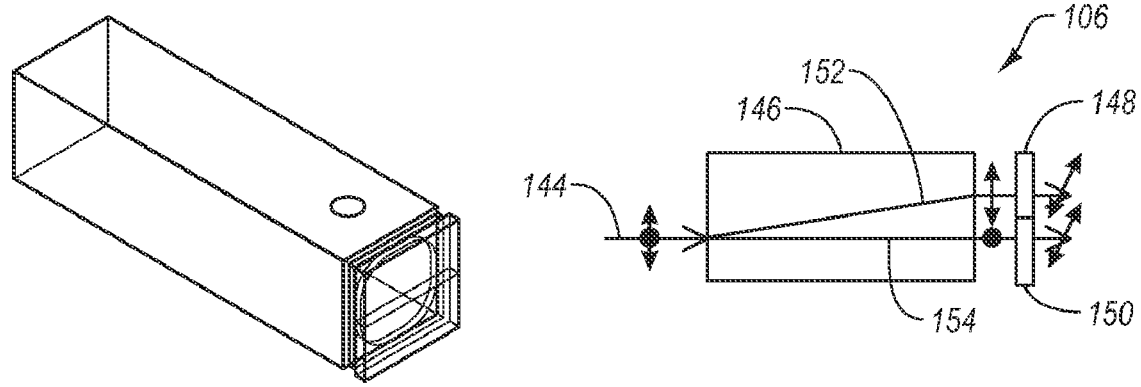
Fig. 3A
Fig. 3B
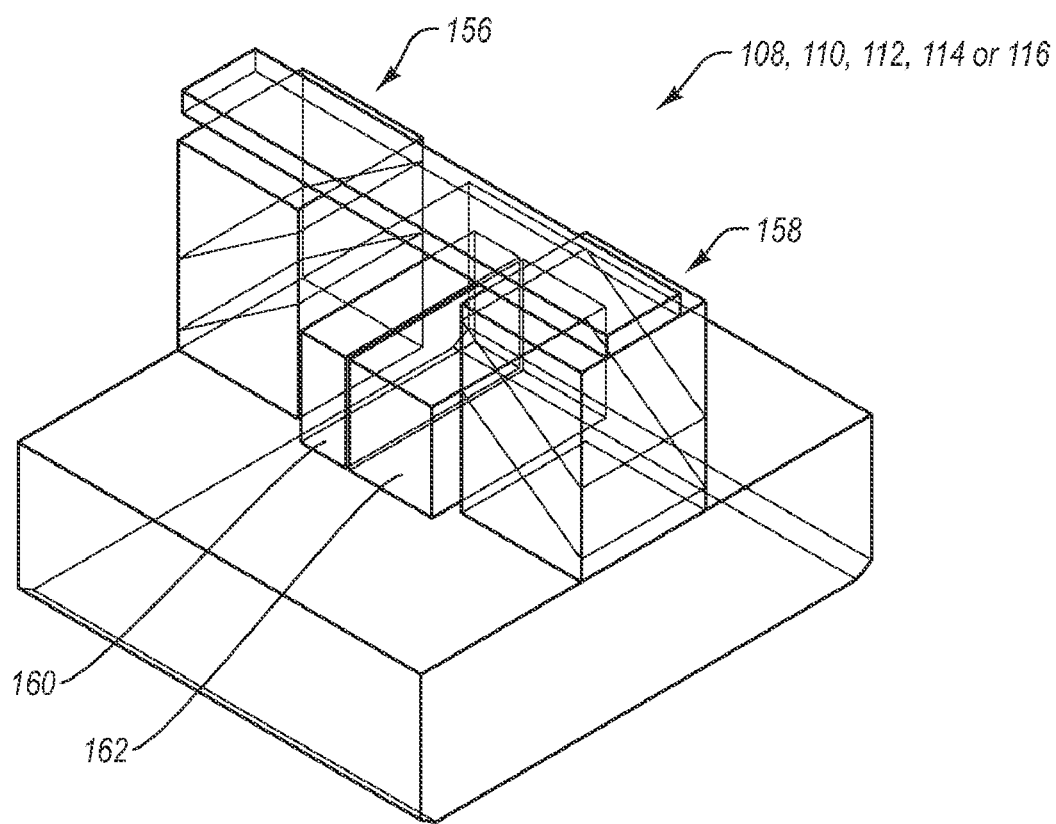
Fig. 4

ASYMMETRICAL INTERLEAVER AND DEINTERLEAVER

BACKGROUND

An optical interleaver is a three-port passive fiber-optic device that is used to interleave two sets of dense wavelength-division multiplexing (DWDM) channels (odd and even channels) into a composite signal stream. For example, an optical interleaver can be configured to receive two multiplexed signals with 100 GHz spacing and interleaves them to create a denser DWDM signal with channels spaced 50 GHz apart. An optical interleaver can also function as a deinterleaver by reversing the direction of the signal stream passing through the interleaver.

Optical interleavers have been widely used in DWDM systems and have become an important building block for optical networks with high-data-rate transmission. Optical interleavers are easier to manufacture in some respects compared to other bandpass filtering technologies, such as thin-film filters and arrayed waveguided gratings. With the increased demand for bandwidth from wideband, wireless, and mobile subscribers, conventional 50 GHz DWDM systems are increasingly unable to provide sufficient bandwidth.

BRIEF SUMMARY OF SOME EXAMPLE EMBODIMENTS

In general, example embodiments of the invention relate to asymmetrical interleavers and deinterleavers. Some example embodiments increase the transmission capacity of long-haul DWDM optical communication systems.

In one example embodiment, an asymmetrical deinterleaver includes first, second, third, fourth, and fifth filter cells interleaved with first, second, third, and fourth waveplates and followed by a fifth waveplate. The filter cells are configured to filter optical signals propagating on first and second legs of an optical loop. The asymmetrical deinterleaver also includes a retro reflector optically coupled with the filter cells and waveplates. The retro reflector is configured to reflect the optical signals between the first leg and the second leg to form the optical loop. The asymmetrical deinterleaver further includes a single-fiber collimator optically coupled to the first leg of the optical loop and a dual-fiber collimator optically coupled to the second leg of the optical loop.

In another example embodiment, an asymmetrical deinterleaver includes first, second, third, fourth, and fifth filter cells interleaved with first, second, third, and fourth half-waveplates and followed by a fifth waveplate. The filter cells are configured to filter optical signals propagating on first and second legs of an optical loop. The asymmetrical deinterleaver also includes a retro reflector optically coupled with the fifth filter cell. The retro reflector is configured to reflect the optical signals between the first leg and the second leg to form the optical loop. The asymmetrical deinterleaver further includes a fifth half-waveplate optically coupled to the first leg of the optical loop between the fifth filter cell and the retro reflector. Finally, the asymmetrical deinterleaver also includes a single-fiber collimator optically coupled to the first leg of the optical loop and a dual-fiber collimator optically coupled to the second leg of the optical loop. A first fiber of the single-fiber collimator is configured to carry an interleaved optical signal with 40 Gb/s data in the odd channel and 10 Gb/s data in the even channel. A second fiber of the dual-fiber collimator is configured to carry a first optical signal with 40 Gb/s data. A third fiber of the dual-fiber collimator is configured to carry a second optical signal with 10 Gb/s data.

In yet another example embodiment, an asymmetrical deinterleaver includes a first leg of an optical loop, a second leg of the optical loop, and a retro reflector configured to reflect the optical signals between the first leg and the second leg to form the optical loop. The first leg includes a single-fiber collimator, a first polarization beam displacing block, first, second, third, fourth, and fifth filter cells interleaved with first, second, third, and fourth half-waveplates, a fifth half-waveplate positioned between the fifth filter cell and the retro reflector. The second leg includes the fifth, fourth, third, second, and first filter cells interleaved with the fourth, third, second, and first half-waveplates, a lateral shift prism, a second polarization beam displacing block, a wedge pair, a third polarization beam displacing block, and a dual fiber collimator.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which:

FIG. 3A is a rear perspective view of a first example polarization beam displacing block of the example asymmetrical deinterleaver of FIG. 1;

FIG. 3B is a schematic view of the first example polarization beam displacing block of FIG. 3A;

FIG. 4 is a perspective view of a first example filter cell of the example asymmetrical deinterleaver of FIG. 1;

DETAILED DESCRIPTION OF SOME EXAMPLE EMBODIMENTS

Example embodiments of the present invention relate to asymmetrical interleavers and deinterleavers. Some example embodiments can increase the transmission capacity of long-haul DWDM optical communication systems.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
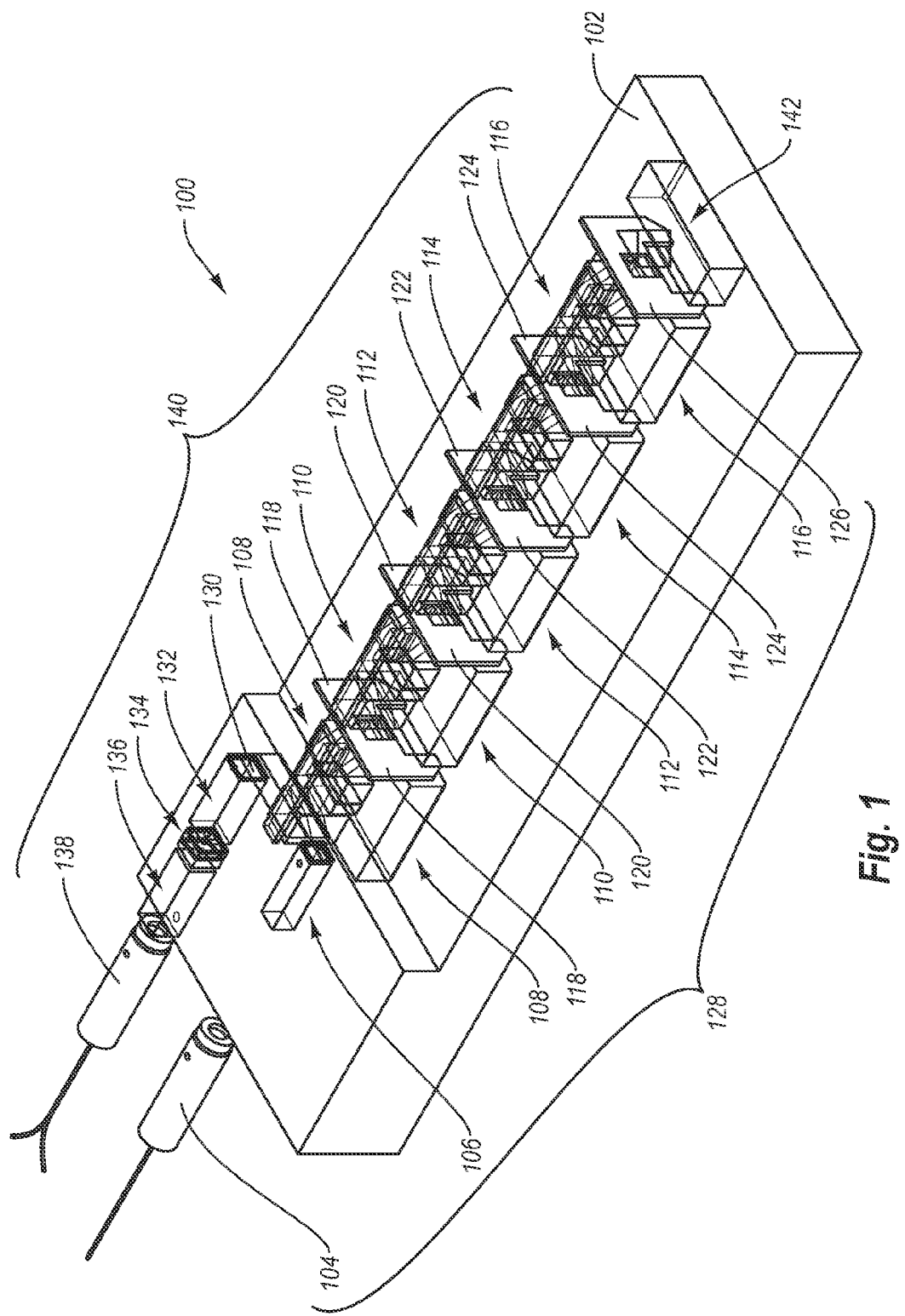
FIG. 1 is a rear perspective view of an example asymmetrical deinterleaver.

Reference is first made to FIG. 1 in which an example asymmetrical deinterleaver 100 is disclosed. While a symmetrical deinterleaver is configured to deinterleave a first optical signal from a second optical signal each having the same data rate, the example asymmetrical deinterleaver 100 is "asymmetrical" because it is configured to deinterleave a first optical signal having a first data rate from a second optical signal having a second data rate. For example, in some example embodiments, the asymmetrical deinterleaver 100 can be configured to deinterleave an interleaved optical signal with 10 Gb/s data in the even channels and 40 Gb/s data in the odd channels into a 10 Gb/s optical signal and a 40 Gb/s optical signal. The interleaved optical signal can have 50 GHz channel spacing, while the 10 Gb/s optical signal and the 40 Gb/s optical signal each have 100 GHz channel spacing.

As disclosed in FIG. 1, the example asymmetrical deinterleaver 100 includes a base 102, a single-fiber collimator 104, a first polarization beam displacing block 106, first, second, third, fourth, and fifth filter cells 108-116 interleaved with first, second, third, and fourth half-waveplates 118-124, and a fifth half-waveplate 126. The elements 106-126 make up a first leg 128 of an optical loop of the asymmetrical deinterleaver 100.

As disclosed in FIG. 1, the example asymmetrical deinterleaver 100 also includes a lateral shift prism 130, a second polarization beam displacing block 132, a wedge pair 134, a third polarization beam displacing block 136, and a dual fiber collimator 138. The elements 108-124 and 130-138 make up a second leg 140 of the optical loop of the asymmetrical deinterleaver 100.

As disclosed in FIG. 1, the example asymmetrical deinterleaver 100 further includes a retro reflector 142 configured to reflect optical signals between the first leg 128 and the second leg 140 to form the optical loop of the asymmetrical deinterleaver 100.

Figure 2A:
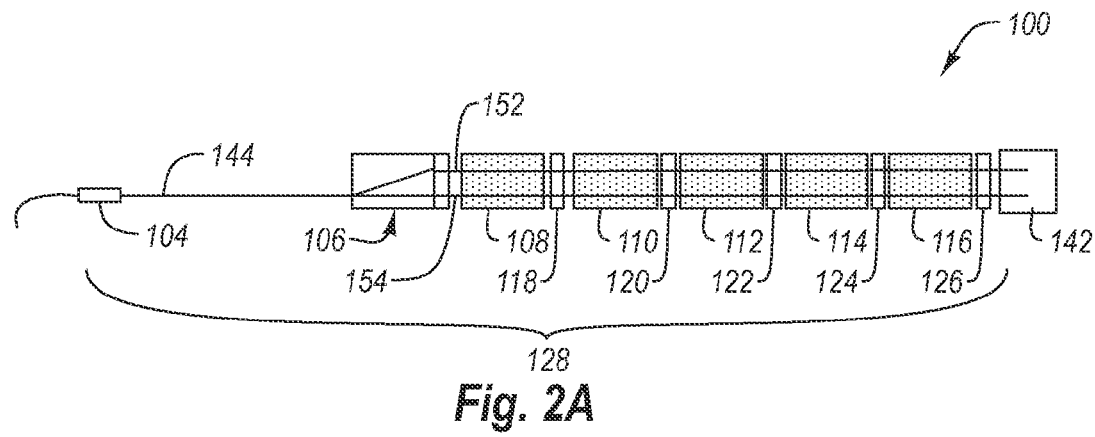
FIG. 2A is a schematic view of the right side of the asymmetrical deinterleaver of FIG. 1.
Figure 2B:
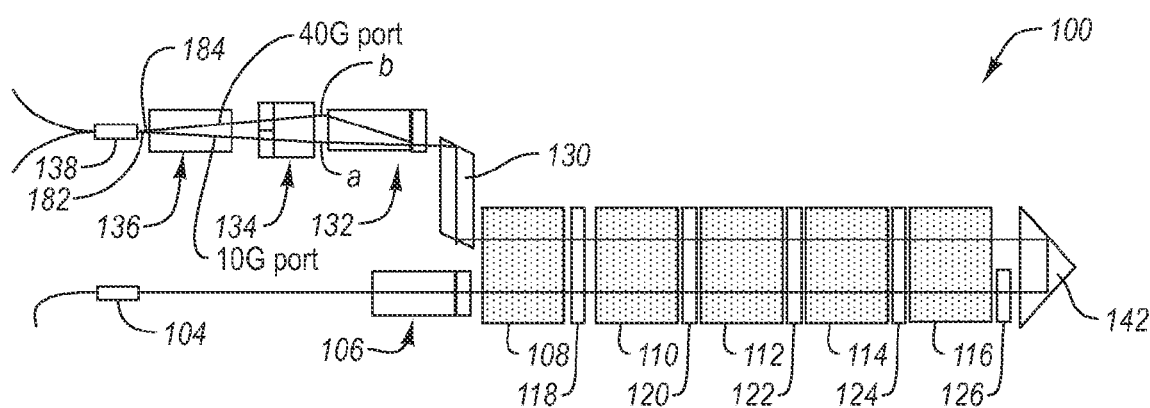
FIG. 2B is a schematic view of the top side of the asymmetrical deinterleaver of FIG. 1.
Figure 2C:
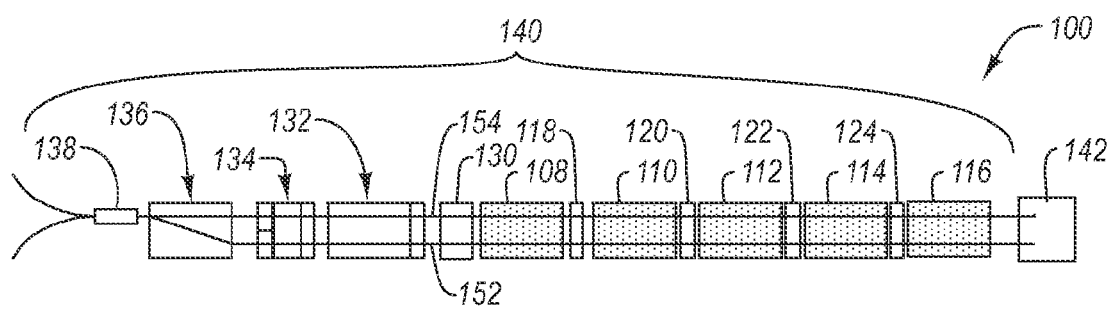
FIG. 2C is a schematic view of the left side of the asymmetrical deinterleaver of FIG. 1.
Figures 5A, 5B:
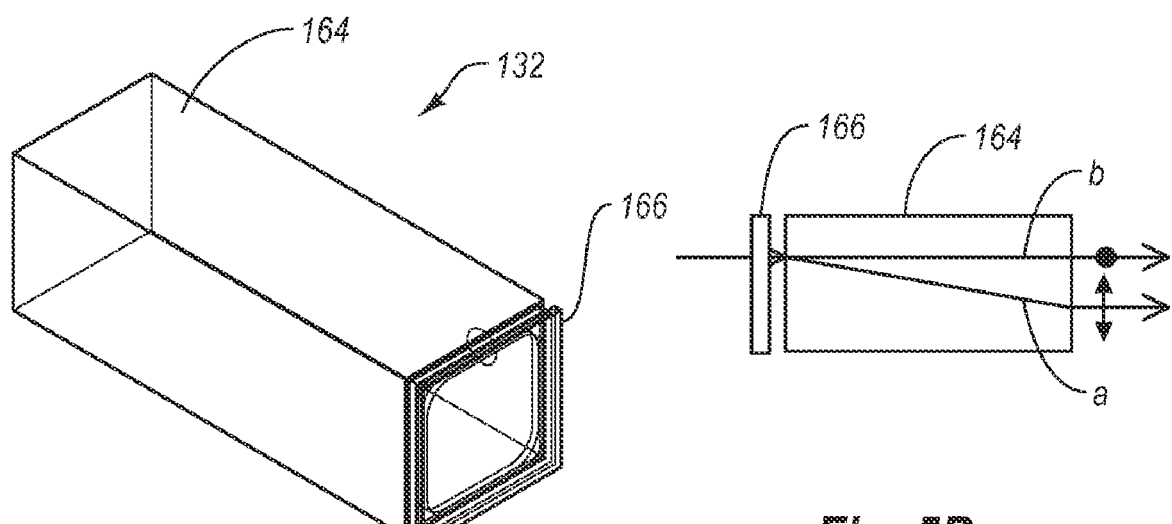
FIG. 5A is a rear perspective view of a second example polarization beam displacing block of the example asymmetrical deinterleaver of FIG. 1.
FIG. 5B is a schematic view of the second example polarization beam displacing block of FIG. 5A.
Figure 6A:
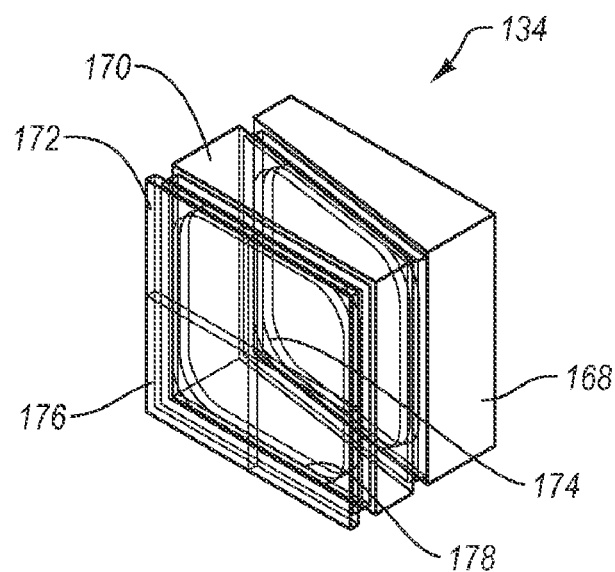
FIG. 6A is a front perspective view of an example wedge pair of the example asymmetrical deinterleaver of FIG. 1.
Figure 6B:
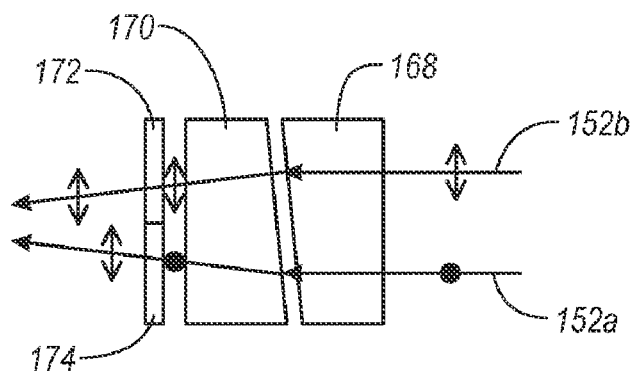
FIG. 6B is a top schematic view of the example wedge of FIG. 5A.
Figure 6C:
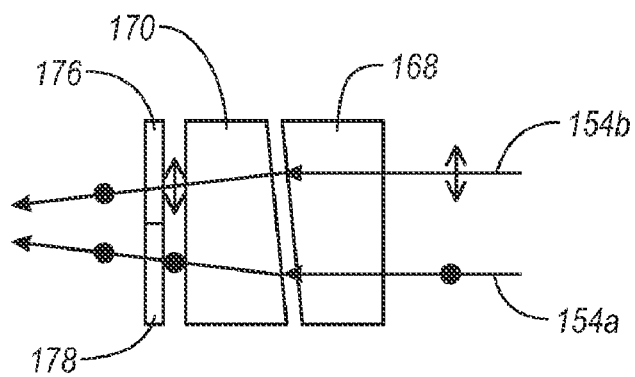
FIG. 6C is a bottom schematic view of the example wedge of FIG. 5A.
Figure 7A:
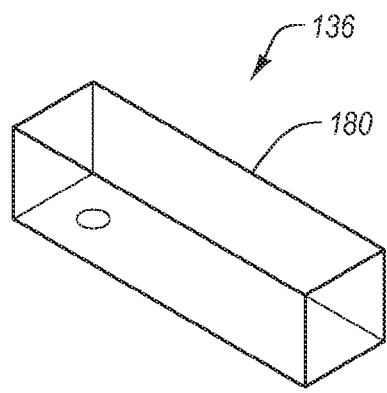
FIG. 7A is a rear perspective view of a third example polarization beam displacing block of the example asymmetrical deinterleaver of FIG. 1.
Figure 7B:
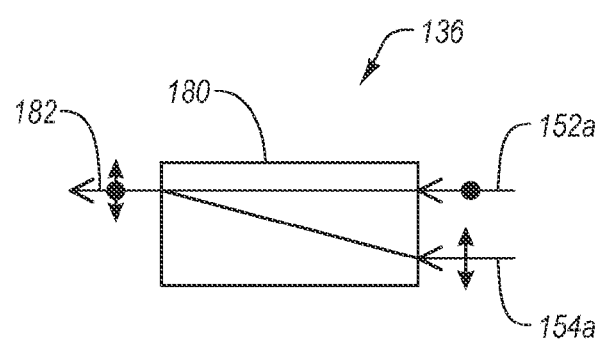
FIG. 7B is a schematic view of the third example polarization beam displacing block of FIG. 7A.

With reference now to FIGS. 2A-2C, additional aspects of the example asymmetrical deinterleaver 100 are disclosed. In particular, FIG. 2A discloses the first leg 128 of the optical loop of the example asymmetrical deinterleaver 100. As disclosed in FIG. 2A, a single interleaved optical signal 144 enters the first leg 128 through the single-fiber collimator 104. The interleaved optical signal 144 includes 10 Gb/s data in the even channels and 40 Gb/s data in the odd channels.

With reference now to FIGS. 2A, 2B, 3A, and 3B, the first polarization beam displacing block 106 includes a polarization beam displacer 146 and first and second half-waveplates 148 and 150 attached to the polarization beam displacer 146. When the interleaved optical signal 144 passes through the first polarization beam displacing block 106, the polarization beam displacer 146 divides the interleaved optical signal 144 into an up beam 152 and a down beam 154. Subsequently, the up and down beams 152 and 154 pass through the first and second half-waveplates 148 and 150, respectively. The first and second half-waveplates 148 and 150 are configured to cause the up and down beams 152 and 154, which initially have different polarizations, to have the same polarizations. For example, where the first half-waveplate 148 is oriented at about −46.7 degrees and the second half-waveplate 150 is oriented at about −1.6 degrees, the up and down beams 152 and 154 exit the first and second half-waveplates 148 and 150 having a polarization of about −3.3 degrees. As used herein, the term "oriented at" refers to the orientation of the optical axis angle of a waveplate crystal with respect to the horizontal line.

With reference again to FIGS. 2A and 2B, and with reference also to FIG. 4, the up and down beams 152 and 154 next pass through the first, second, third, fourth, and fifth filter cells 108-116 interleaved with the first, second, third, and fourth half-waveplates 118-124, and through the fifth half-waveplate 126. As disclosed in FIG. 4, each of the filter cells 108-116 includes opposing optical polarization beam splitters 156 and 158 displaced from one another by the optical elements 160 and 162. Each of the filter cells 108-116 can be a 100 GHz cell. Each of the filter cells 108-116 can be similar to any of the "polarization beam splitting cells" or "optical filter cells" disclosed in U.S. Pat. Nos. 6,694,066, 6,850,364, or 7,173,763, each of which is incorporated herein by reference in its entirety.

The half-waveplates 118-126 disclosed in FIG. 2B enable the filter cells 108-116 to be mounted on the planar base 102 (disclosed in FIG. 1) by changing the polarization of the up and down beams 152 and 154. For example, in some example embodiments, the first half-waveplate 118 is oriented at about −13.1 degrees, the second half-waveplate is oriented at about 8.5 degrees, the third half-waveplate is oriented at about −4.4 degrees, the fourth half-waveplate is oriented at about 0.4 degrees, and the fifth half-waveplate is oriented at about −42.4 degrees.

As disclosed in FIGS. 2A-2C, after passing through the first leg 128 of the optical loop of the asymmetrical deinterleaver 100, the up and down beams 152 and 154 are reflected by the retro reflector 142 to the second leg 140 of the optical loop of the asymmetrical deinterleaver 100. The up and down beams 152 and 154 then pass through the fifth filter cell 116, the fourth half-waveplate 124, the fourth filter cell 114, the third half-waveplate 122, the third filter cell 112, the second half-waveplate 120, the second filter cell 110, the first half-waveplate 118, and the first filter cell 108. Next, the up and down beams 152 and 154 next pass through the lateral shift prism 130. The lateral shift prism 130 is used to shift the up and down beams 152 and 154 laterally to increase the distance between the single-fiber collimator 104 and dual-fiber collimator 138. The up and down beams 152 and 154 then pass through the second polarization beam displacing block 132.

With reference now to FIGS. 2B, 2C, 5A and 5B, the second polarization beam displacing block 132 includes a polarization beam displacer 164 and a half-waveplate 166 attached to the polarization beam displacer 164. In some example embodiments, the half-waveplate 166 is oriented at about −41.6 degrees. When the up and down beams 152 and 154 pass through the second polarization beam displacing block 132, the polarization beam displacer 164 divides the up beam 152 into a 10 Gb/s beam 152a and a 40 Gb/s beam 152b and divides the down beam 154 into a 10 Gb/s beam 154a and a 40 Gb/s beam 154b.

With reference now to FIGS. 2B, 2C, 6A, 6B, and 6C the wedge pair includes a first wedge 168, a second wedge 170 optically coupled to the first wedge 168, and first, second, third, and fourth half-waveplates 172-178 attached to the second wedge 170. In some example embodiments, the first and second wedges 168 and 170 are YVO4 wedges, the first and fourth half-waveplates 172 and 178 are oriented at about 0 degrees, and the second and third half-waveplates 174 and 176 are oriented at about 45 degrees.

With reference now to FIGS. 2B, 2C, 7A and 7B, the third polarization beam displacing block 136 includes a polarization beam displacer 180. When the 10 Gb/s up beam 152a, the 40 Gb/s down beam 152b, the 10 Gb/s down beam 154a, and the 40 Gb/s down beam 154b pass through the third polarization beam displacing block 136, the polarization beam displacer 180 combines the 10 Gb/s up beam 152a with the 10 Gb/s down beam 154a into a 10 Gb/s beam 182 and combines the 40 Gb/s down beam 152b and the 40 Gb/s down beam 154b into a 40 Gb/s beam 184. Thus, as disclosed in FIG. 2B, the 10 Gb/s beam 182 and the 40 Gb/s beam 184 exit the second leg 140 through the dual-fiber collimator 138.

Figure 8:
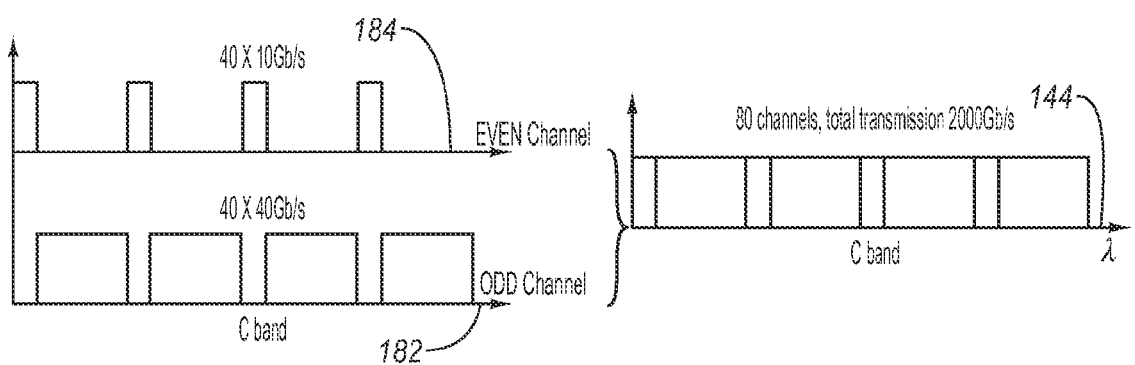
FIG. 8 is a chart of the interleaving functionality of the example asymmetrical deinterleaver of FIG. 1.

Although the example asymmetrical deinterleaver 100 has been discussed herein in terms of its deinterleaver functionality, it is understood that the deinterleaver 100 can also function as an interleaver. With reference now to FIGS. 2B and 8, when the 10 Gb/s beam 182 and the 40 Gb/s beam 184 enter the second leg 140 of the deinterleaver 100 through the dual-fiber collimator 138, the 10 Gb/s beam 182 and the 40 Gb/s beam 184 are combined into a single interleaved optical signal 144 that exits through the single-fiber collimator 104. As disclosed in FIG. 8, reversing the direction of the signal stream passing through the deinterleaver 100 results in a total transmission capacity of 2000 Gb/s in the C Band.

Figure 9:
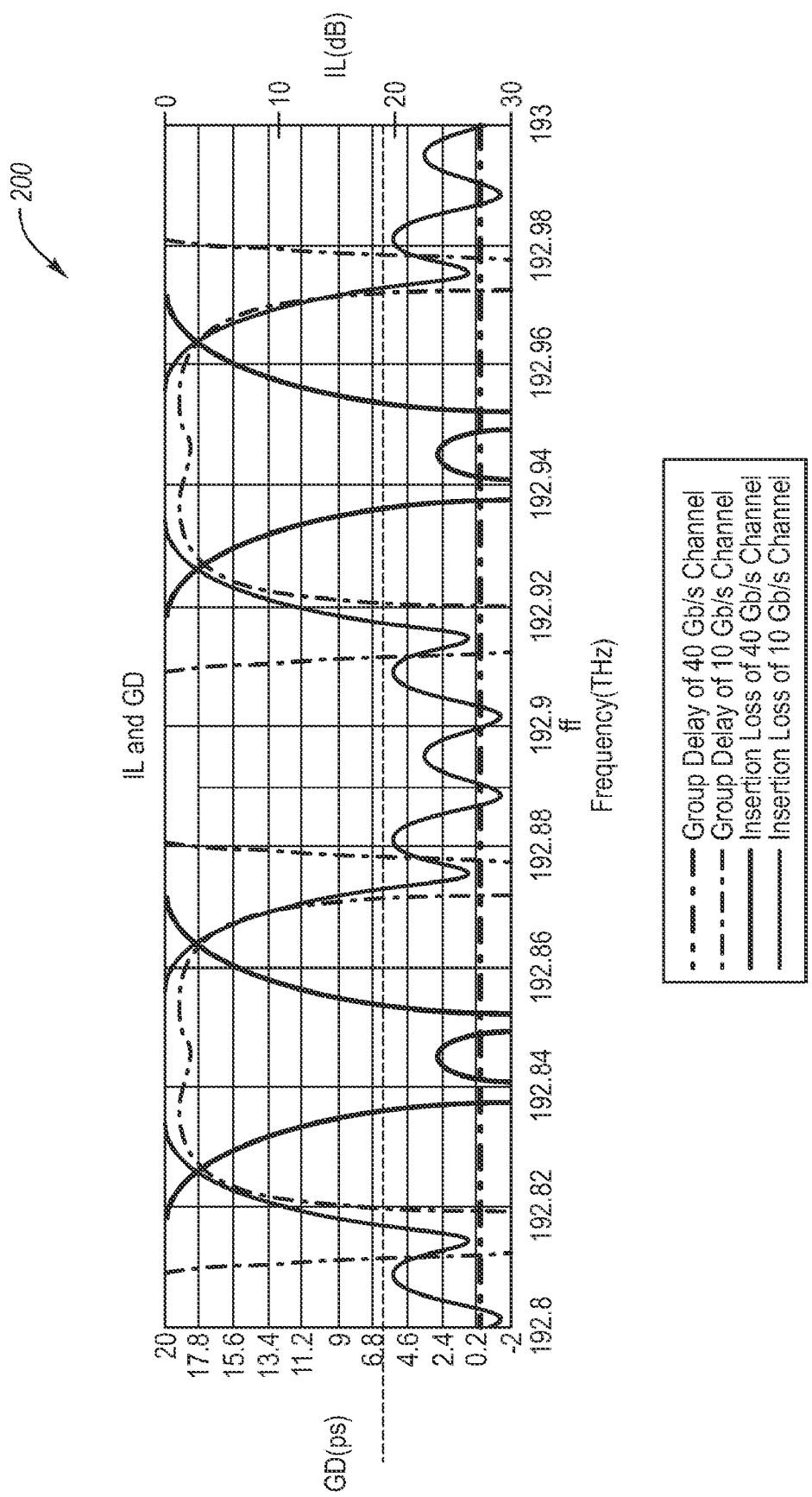
FIG. 9 is a chart of the insertion loss and group delay of the example asymmetrical deinterleaver of FIG. 1.

With reference finally to FIG. 9, a chart 200 of simulated insertion loss and group delay of the example asymmetrical deinterleaver 100 of FIG. 1 is disclosed. In particular, the chart 200 demonstrates that the example asymmetrical deinterleaver 100 exhibits athermal and flat top 50 GHz channel spacing.

The example embodiments disclosed herein may be embodied in other specific forms. The example embodiments disclosed herein are to be considered in all respects only as illustrative and not restrictive.

What is claimed is:

1. An asymmetrical deinterleaver comprising:
   first, second, third, fourth, and fifth filter cells interleaved with first, second, third, and fourth waveplates and followed by a fifth waveplate, the filter cells configured to filter optical signals propagating on first and second legs of an optical loop;
   a retro reflector optically coupled with the filter cells and waveplates, the retro reflector configured to reflect the optical signals between the first leg and the second leg to form the optical loop;
   a single-fiber collimator optically coupled to the first leg of the optical loop; and
   a dual-fiber collimator optically coupled to the second leg of the optical loop.

2. The asymmetrical deinterleaver as recited in claim 1, wherein the single-fiber collimator carries a interleaved optical signal with 40 Gb/s data in the odd channel and 10 Gb/s data in the even channel.

3. The asymmetrical deinterleaver as recited in claim 2, wherein the first, second, third, fourth, and fifth filter cells are 100 GHz filter cells.

4. The asymmetrical deinterleaver as recited in claim 3, wherein the fifth waveplate is optically coupled to the first leg of the optical loop between the fifth filter cell and the retro reflector.

5. The asymmetrical deinterleaver as recited in claim 4, wherein:
   the first waveplate comprises a half-waveplate oriented at about −13.1 degrees;
   the second waveplate comprises a half-waveplate oriented at about 8.5 degrees;
   the third waveplate comprises a half-waveplate oriented at about −4.4 degrees;
   the fourth waveplate comprises a half-waveplate oriented at about 0.4 degrees; and
   the fifth waveplate comprises a half-waveplate oriented at about −42.4 degrees.

6. The asymmetrical deinterleaver as recited in claim 4, further comprising:
   a first polarization beam displacing block optically coupled to the first leg of the optical loop between the single-fiber collimator and the first filter cell;
   a second polarization beam displacing block optically coupled to the second leg of the optical loop between the dual-fiber collimator and the first filter cell; and
   a third polarization beam displacing block optically coupled to the second leg of the optical loop between the second polarization beam displacing block and the first filter cell.

7. The asymmetrical deinterleaver as recited in claim 6, wherein the first polarization beam displacing block comprises:
   a polarization beam displacer; and
   first and second half-waveplates attached to the polarization beam displacer, wherein the first half-waveplate is oriented at about −46.7 degrees and the second half-waveplate is oriented at about −1.6 degrees.

8. The asymmetrical deinterleaver as recited in claim 6, wherein the second polarization beam displacing block comprises:
   a polarization beam displacer;
   a half-waveplate oriented at about −41.6 degrees attached to the polarization beam displacer.

9. The asymmetrical deinterleaver as recited in claim 6, further comprising:
   a wedge pair optically coupled to the second leg of the optical loop between the third polarization beam displacing block and the second polarization beam displacing block; and
   a lateral shift prism optically coupled to the second leg of the optical loop between the second beam displacing block and the first filter cell.

10. The asymmetrical deinterleaver as recited in claim 9, wherein the wedge pair comprises:
    a first YVO4 wedge;
    a second YVO4 wedge optically coupled to the first YVO4 wedge; and
    first, second, third, and fourth half-waveplates attached to the second YVO4 wedge, wherein the first and fourth half-waveplates are oriented at about 0 degrees and the second and third half-waveplates are oriented at about 45 degrees.

11. An asymmetrical deinterleaver comprising:
first, second, third, fourth, and fifth filter cells interleaved with first, second, third, and fourth half-waveplates, the filter cells configured to filter optical signals propagating on first and second legs of an optical loop;
a retro reflector optically coupled with the fifth filter cell, the retro reflector configured to reflect the optical signals between the first leg and the second leg to form the optical loop;
a fifth half-waveplate optically coupled to the first leg of the optical loop between the fifth filter cell and the retro reflector;
a single-fiber collimator optically coupled to the first leg of the optical loop, a first fiber of the single-fiber collimator configured to carry an interleaved optical signal with 40 Gb/s data in the odd channel and 10 Gb/s data in the even channel; and
a dual-fiber collimator optically coupled to the second leg of the optical loop, a second fiber of the dual-fiber collimator configured to carry a first optical signal with 40 Gb/s data and a third fiber of the dual-fiber collimator configured to carry a second optical signal with 10 Gb/s data.

12. The asymmetrical deinterleaver as recited in claim 11, wherein:
the first waveplate comprises a half-waveplate oriented at about −13.1 degrees;
the second waveplate comprises a half-waveplate oriented at about 8.5 degrees;
the third waveplate comprises a half-waveplate oriented at about −4.4 degrees;
the fourth waveplate comprises a half-waveplate oriented at about 0.4 degrees;
the fifth waveplate comprises a half-waveplate oriented at about −42.4 degrees; and
the first, second, third, fourth, and fifth filter cells are 100 GHz filter cells.

13. The asymmetrical deinterleaver as recited in claim 11, further comprising:
a first polarization beam displacing block optically coupled to the first leg of the optical loop between the single-fiber collimator and the first filter cell;
a second polarization beam displacing block optically coupled to the second leg of the optical loop between the dual-fiber collimator and the first filter cell; and
a third polarization beam displacing block optically coupled to the second leg of the optical loop between the second polarization beam displacing block and the first filter cell.

14. The asymmetrical deinterleaver as recited in claim 13, wherein the first polarization beam displacing block comprises:
a polarization beam displacer; and
first and second half-waveplates attached to the polarization beam displacer, wherein the first half-waveplate is oriented at about −46.7 degrees and the second half-waveplate is oriented at about −1.6 degrees.

15. The asymmetrical deinterleaver as recited in claim 13, wherein the second polarization beam displacing block comprises:
a polarization beam displacer;
a half-waveplate oriented at about −41.6 degrees attached to the polarization beam displacer.

16. The asymmetrical deinterleaver as recited in claim 13, further comprising:
a wedge pair optically coupled to the second leg of the optical loop between the third polarization beam displacing block and the second polarization beam displacing block; and
a lateral shift prism optically coupled to the second leg of the optical loop between the second beam displacing block and the first filter cell.

17. The asymmetrical deinterleaver as recited in claim 16, wherein the wedge pair comprises:
a first YVO4 wedge;
a second YVO4 wedge optically coupled to the first YVO4 wedge; and
first, second, third, and fourth half-waveplates attached to the second YVO4 wedge, wherein the first and fourth half-waveplates are oriented at about 0 degrees and the second and third half-waveplates are oriented at about 45 degrees.

18. An asymmetrical deinterleaver comprising:
a first leg of an optical loop, the first leg comprising:
a single-fiber collimator;
a first polarization beam displacing block;
first, second, third, fourth, and fifth filter cells interleaved with first, second, third, and fourth half-waveplates; and
a fifth half-waveplate;
a second leg of the optical loop, the second leg comprising:
the fifth, fourth, third, second, and first filter cells interleaved with the fourth, third, second, and first half-waveplates;
a lateral shift prism;
a second polarization beam displacing block;
a wedge pair;
a third polarization beam displacing block; and
a dual fiber collimator;
a retro reflector configured to reflect the optical signals between the first leg and the second leg to form the optical loop.

19. The asymmetrical deinterleaver as recited in claim 18, wherein:
the first waveplate comprises a half-waveplate oriented at about −13.1 degrees;
the second waveplate comprises a half-waveplate oriented at about 8.5 degrees;
the third waveplate comprises a half-waveplate oriented at about −4.4 degrees;
the fourth waveplate comprises a half-waveplate oriented at about 0.4 degrees; and
the fifth waveplate comprises a half-waveplate oriented at about −42.4 degrees.

20. The asymmetrical deinterleaver as recited in claim 18, wherein:
the first polarization beam displacing block comprises:
a polarization beam displacer; and
first and second half-waveplates attached to the polarization beam displacer, wherein the first half-waveplate is oriented at about −46.7 degrees and the second half-waveplate is oriented at about −1.6 degrees;
the second polarization beam displacing block comprises:
a polarization beam displacer;
a half-waveplate oriented at about −41.6 degrees attached to the polarization beam displacer;
the wedge pair comprises:
a first YVO4 wedge;
a second YVO4 wedge optically coupled to the first YVO4 wedge; and first, second, third, and fourth half-waveplates attached to the second YVO4 wedge, wherein the first and fourth half-waveplates are oriented at about 0 degrees and the second and third half-waveplates are oriented at about 45 degrees; and the first, second, third, fourth, and fifth filter cells are 100 GHz filter cells.

* * * * *